United States Patent [19]

Rousseau

[11] Patent Number: 4,902,187
[45] Date of Patent: Feb. 20, 1990

[54] DRUM DOLLY ATTACHMENT APPARATUS

[75] Inventor: Kenneth E. Rousseau, Wichita, Kans.

[73] Assignee: Harper Truck, Inc., Wichita, Kans.

[21] Appl. No.: 237,339

[22] Filed: Aug. 29, 1988

[51] Int. Cl.⁴ ............................................... B62B 1/06
[52] U.S. Cl. .................................. 414/456; 414/622; 414/490; 280/47.27; 294/90
[58] Field of Search ............... 414/444, 445, 447, 450, 414/451, 452, 453, 454, 455, 456, 622, 490; 280/47.24, 47.28, 47.27; 294/90

[56] References Cited

U.S. PATENT DOCUMENTS

| | | | |
|---|---|---|---|
| 1,704,769 | 3/1969 | Siner | 280/47.27 |
| 2,447,300 | 8/1948 | Williams | 414/456 X |
| 2,541,613 | 2/1951 | Roe | 414/456 |
| 2,616,577 | 11/1952 | Barrett | 414/450 |
| 2,635,775 | 4/1953 | Ernst | 414/622 |
| 2,673,654 | 3/1954 | Kaufman | 414/450 |
| 2,814,403 | 11/1957 | Ericson | 414/622 |
| 3,674,164 | 7/1972 | Kaufman | 414/450 |
| 3,815,767 | 6/1974 | Lund et al. | 414/456 |
| 4,257,729 | 3/1981 | Morissette | 414/454 X |
| 4,741,659 | 5/1988 | Berg | 414/622 X |

Primary Examiner—Robert J. Spar
Assistant Examiner—Robert S. Katz
Attorney, Agent, or Firm—Phillip A. Rein

[57] ABSTRACT

This invention relates to a drum dolly attachment apparatus having a conventional dolly truck assembly with a drum attachment assembly of this invention connected thereto. The dolly truck assembly includes a main truck frame on a support wheel assembly which is operable to be placed adjacent and under a drum member for connecting thereto. The drum attachment assembly is slidably mounted on an upright vertical handle of the dolly truck assembly and is operable to be placed in contact and grasp a main rim portion of the drum member. The drum attachment assembly is constructed so as to move vertically as required to adjust its position on the main rim portion of the drum member when moved from a vertical to an inclined position. The drum attachment assembly includes a drum connector assembly having a first stationary drum connector connectable to an upper inner portion of the main rim portion and a second actuator drum connector connectable to an outer lower portion of the main rim portion of the drum member. The actuator drum connector is movable against a bias member to a released position and vertically on the support tube of the dolly truck assembly for use in attaching to another drum member for a subsequent grasping, moving, and transporting operation.

4 Claims, 2 Drawing Sheets

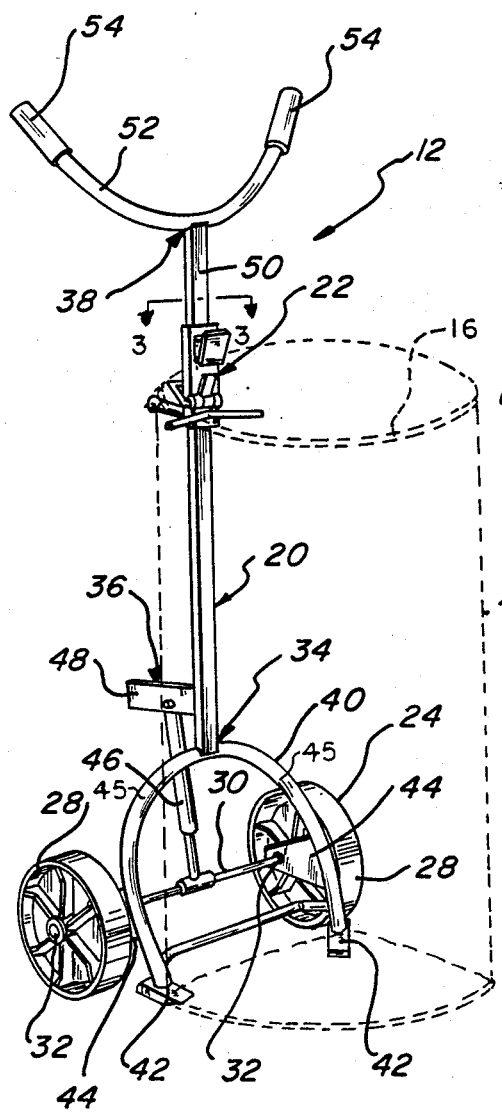
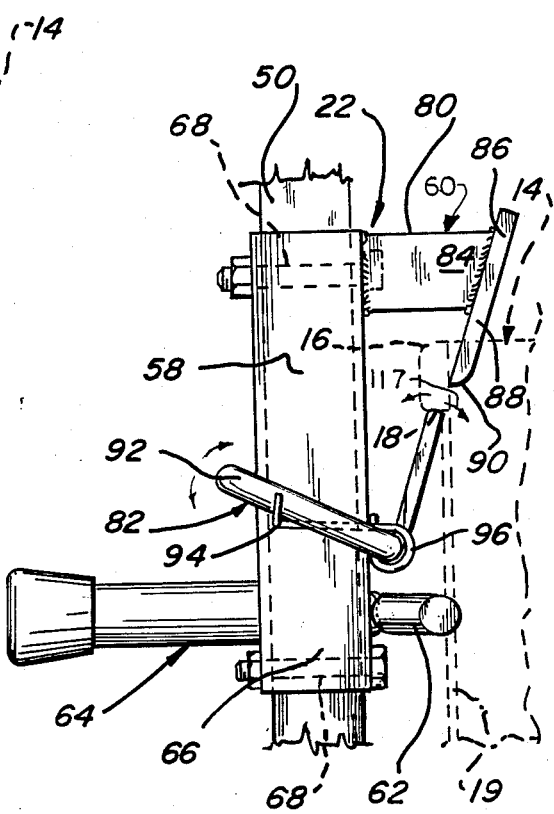
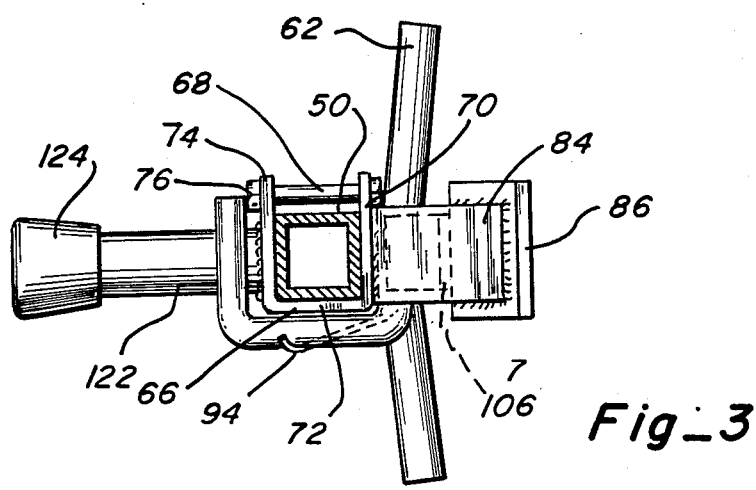
Fig_1
Fig_2
Fig_3

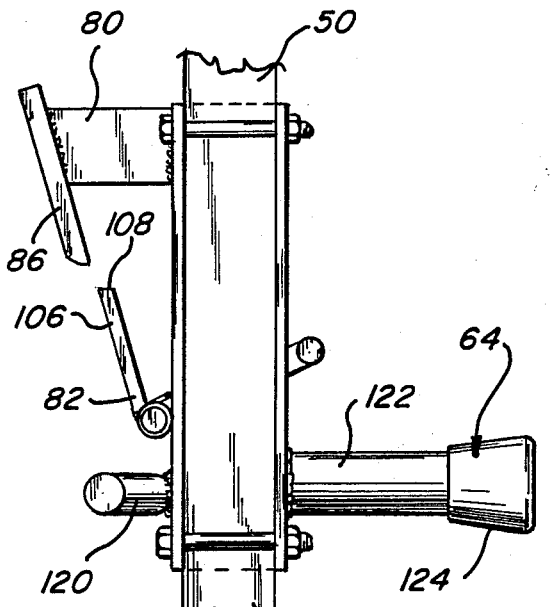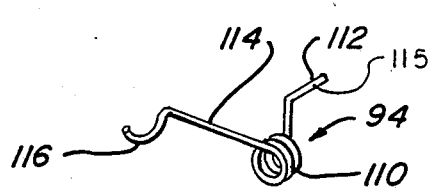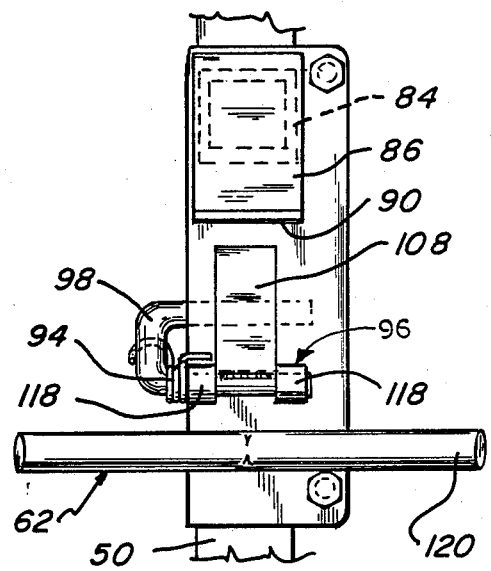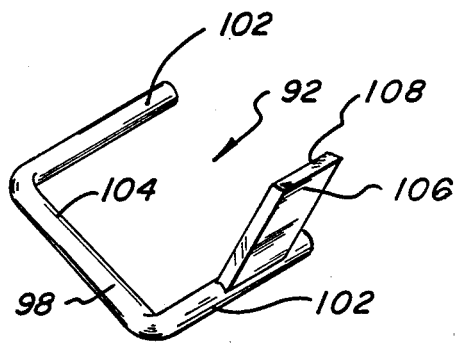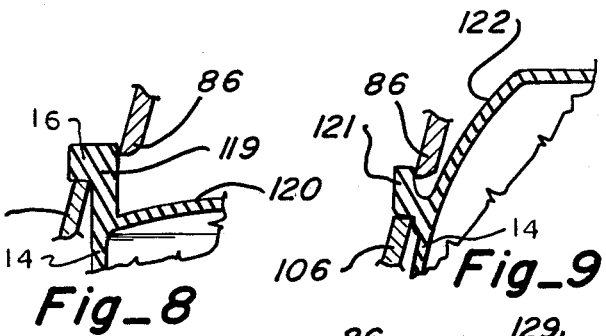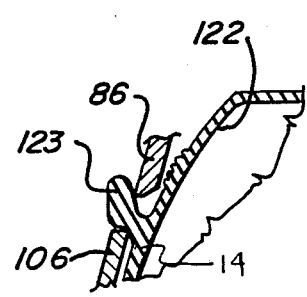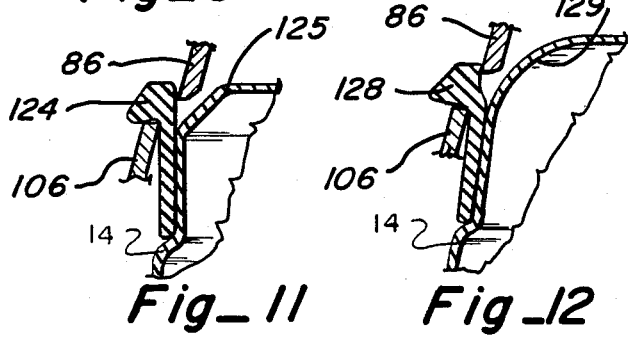

DRUM DOLLY ATTACHMENT APPARATUS

PRIOR ART

A patent search on this invention revealed the following United States Patents:

| U.S. Pat. No. | Invention | Inventor |
| --- | --- | --- |
| 773,027 | HAND TRUCK | Peck et al |
| 2,150,503 | BARREL TRUCK | Roe C. Hawkins |
| 2,447,300 | GRASP DEVICE | William A. Williams |
| 2,574,825 | BARREL TRUCK | William L. Guild |
| 2,616,577 | HAND TRUCK | Arthur M. Barrett |
| 2,673,654 | BARREL AND DRUM TRUCK | Jonas J. Kaufman |
| 2,779,492 | HAND TRUCK | Sidney D. Lapham |
| 4,492,505 | CLAMPING DEVICE FOR USE ON HAND TRUCK | Donald T. Dunning |

The Dunning patent discloses a clamping device for use on hand trucks but is substantially different in structure and operation.

The Peck et al, Hawkins, Guild, and Lapham patents disclose hand trucks used to transport barrel structures but utilizing substantially different attachment structures relative to the applicant's invention.

The Williams patent discloses a grasp type device for attachment to an outer rim of a barrel structure.

The Barrett patent teaches a barrel attachment structure on a hand truck dolly as best noted in FIG. 2. In this attachment structure, both of the latch elements are spring biased as by a leaf spring member. The Barrett patent discloses a handle member operable to move the attachment structure vertically on a support standard.

The Kaufman patent discloses a barrel and drum truck having an attachment structure including (1) an outer craddle member which abuts a barrel; (2) an upper hook portion which abuts an inner upper portion of a lip on the barrel or drum member; (3) a resilent spring biased clamp element to engage an outer lower surface of the lip on the barrel member; (4) a latch member to move the resilent clamp element out of contact with the barrel structure; and (5) a laterally extended handle member for moving the entire attachment structure axially on its support column or vertical support members.

PREFERRED EMBODIMENT OF THE INVENTION

In one preferred embodiment of this invention, a drum dolly attachment apparatus is provided which is releasably connectable to a main rim portion of a drum member which may be constructed of steel, cardboard, fiberglass, or other plastic materials. The drum dolly attachment apparatus includes a dolly truck assembly having a drum attachment assembly of this invention connected thereto. The dolly truck assembly is of a conventional nature having a support wheel assembly with a main truck frame assembly connected thereto. The main truck frame assembly is provided with a barrel support assembly secured by a connector arm assembly to the support wheel assembly and, having extended upwardly therefrom, a main handle assembly. The main handle assembly is operable in a conventional manner to tilt, elevate, and convey the drum member connected thereto from one location to another through the use of the drum attachment assembly. The drum attachment assembly is provided with (1) a main support housing assembly; (2) a drum connector assembly secured to the main support housing assembly; (3) a drum contact member adapted to contact a portion of the drum member; and (4) an attachment handle member operable to raise and lower the entire drum attachment assembly on the main handle assembly. The main support housing assembly is provided with a housing member which is releasably connected to the main handle assembly and operable to be axially movable therealong. The drum connector assembly is provided with (1) a stationary drum connector operable to contact an upper inner portion of the main rim portion of the drum member; and (2) an actuator drum connector to releasably contact a lower outer portion of the main rim portion of the drum member. The actuator drum connector is provided with an actuator connector member urged by a biased member into automatic contact with the main rim portion in a connected condition. The bias member is operable to hold the actuator connector member in the connected condition and the actuator connector member is pivotal against force of the bias member when desired to place in the released condition from the main rim portion of the drum member.

OBJECTS OF THE INVENTION

One object of this invention is to provide a drum dolly attachment apparatus which is readily attached to a main rim portion on a drum member providing a cam action to assure positive locking thereon and having means for readily releasing same when so desired.

One further object of this invention is to provide a drum dolly attachment apparatus having a conventional dolly truck assembly with a new and novel drum attachment assembly connected thereto being movable vertically for ease of automatic attachment to a main rim portion of a drum member, and especially effective for use on cardboard, fiberglass, and plastic drum members.

One other object of this invention is to provide a drum dolly attachment apparatus including a new and novel drum attachment assembly having a drum connector assembly with fixed and movable drum connectors which cooperate to positively and securely grasp a main rim portion on a drum member plus having means for moving same vertically and releasing therefrom when so desired.

Still, one further object of this invention is to provide a drum dolly attachment apparatus having a drum attachment assembly connected to a dolly truck assembly and which can be readily connectable to existing dolly truck assemblies to provide a new and novel means for attachment to a main rim portion of a drum member.

Still, one other object of this invention is to provide a drum attachment assembled which is reliable in operation, sturdy in construction, economical to manufacture, and substantially maintenance free.

Various other objects, advantages and features of the invention will become apparent to those skilled in the art from the following discussion, taken in conjunction with the accompanying drawings, in which:

FIGURES OF THE INVENTION

FIG. 1 is a perspective view of a drum dolly attachment apparatus of this invention illustrating a usage position next to a drum member as shown in dotted lines;

FIG. 2 is an enlarged fragmentary side elevational view of the drum dolly attachment apparatus of this invention as connected to a main rim portion of the drum member illustrated in dotted lines;

FIG. 3 is an enlarged fragmentary sectional view taken along line 3—3 in FIG. 1;

FIG. 4 is a side elevational view similar to FIG. 2 illustrating an opposite side thereof;

FIG. 5 is a front elevational view of the structure shown in FIGS. 2 and 4;

FIG. 6 is a perspective view of an actuator connector member of a drum connector assembly of this invention;

FIG. 7 is a perspective view of a bias member of the drum connector assembly of this invention; and FIGS. 8-12, inclusive, are schematic diagrams illustrating connection of the drum attachment assembly to various embodiments of main rim portions on drum members.

The following is a discussion and description of preferred specific embodiments of the drum dolly attachment apparatus of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail, and in particular to FIG. 1, a drum dolly attachment apparatus of this invention, indicated generally at 12, is shown in a normal upright position adjacent to a drum member 14 for attaching to a main rim portion 16. The main rim portion 16 has a lip portion 18 integral with a side wall 19. As noted in FIGS. 8-12, inclusive, a main rim portion of various drum members may be of various shapes and design but the drum dolly attachment apparatus 12 of this invention is operable to contact, secure, and grasp the various designs of subject main rim portions as will be explained.

The drum dolly attachment apparatus 12 includes a dolly truck assembly 20 having a drum attachment assembly 22 of this invention connected thereto. The dolly truck assembly 20 includes a support wheel assembly 24 having a main truck frame assembly connected thereto.

As noted in FIG. 1, the support wheel assembly 24 includes a pair of wheel members 28 rotatably connected to opposite outer ends of a main support shaft 30. The wheel members 28 are mounted through bearing members 32 to the respective outer ends of the main support shaft 30.

The main truck frame assembly includes (1) a barrel support assembly 34 to abut and contact a lower portion of the drum member 14 as will be noted; (2) a connector arm 36 operable to be connected to the main support shaft 30; and (3) a main handle assembly 38 which is secured to an upper portion of the barrel support assembly 34 and to the connector arm assembly 36.

The barrel support assembly 34 is provided with an arcuate support tube 40 having foot members 42 connected to outer spaced end portions and main support trusses 44 to connect the arcuate support tube 40 to the main support shaft 30 adjacent the wheel members 28.

The arcuate support tube 40 is of an inclined curved nature so as to permit the barrel member 14 to be placed between opposed arm portions 45 and having the foot support members 42 operable to be placed under bottom edge portions of the drum member 14 to provide vertical support thereto when tilting the dolly truck assembly 20 in an inclined position for conveyance of the attached drum memebr 14.

The connector arm assembly 36 includes a support tube 46 having a lower end secured to a central portion of the main support shaft 30 and an upper end secured by a lateral support arm 48 to a lower portion of the main handle assembly 38 to provide the necessary rigid connection therebetween.

The main handle assembly 38 is provided with a primary upright support tube 50 secured as by welding at a lower end to a topmost portion of the arcuate support tube 40 and a an arcuate handle member 52 connected to an upper end of the support tube 50. The support tube 50 is of a generally square shape in transverse cross sections as noted in FIG. 3.

The arcuate handle member 52 is provided with grip members 54 at outer ends thereof of a resilient material for ease of grasping and moving the entire dolly truck assembly 20. The arcuate handle member 52 is of a length and inclined nature so as to provide supports on outer portions of the grip members 54 on a ground support surface when desired to tilt the drum member 14 to a generally horizontal position for ease of draining liquid material therefrom or other similar purposes.

As collectively illustrated in FIGS. 2-5, inclusive, the drum attachment assembly 22 includes (1) a main support housing assembly 58 which is slidably mounted on the primary support tube 50; (2) a drum connector assembly 60 secured to the main support housing assembly 58 which is engagable with the main rim portion 16 on the drum member 14; (3) a drum contact member 62 adapted to contact the side wall 19 of the drum member 14; and (4) an attachment handle member 64 extended laterally from a back side of the main support housing assembly 58 for ease of vertical movement of the entire drum attachment assembly 22.

The main support housing assembly 58 includes a housing member 66 of generally U-shape in transverse cross section and secured as by housing connectors 68 in a clamped but sliding moving engagement about the primary support tube 50. The housing member 66 is provided with a front wall 70 integral along one edge with an intermediate wall 72 which, in turn, is integral along an opposite edge with a back wall 74. It is noted that the internal dimensions of the housing member 66 is such as to be slidably engagable about the primary support tube 50 so as to be movable axially relative thereto.

The housing connectors 68 are nut and bolt members 76 which are extended through aligned openings in the opposed front wall 70 and the back wall 74 as noted in FIG. 3. The use of the housing connectors 68 permits the entire drum attachment assembly 22 to be removed for repair and/or maintenance as so required.

The drum connector assembly 60 includes a stationary drum connector 80 secured to an upper portion of the housing member 66 and an actuator drum connector 82 connected to an intermediate portion of the housing member 66. The actuator drum connector 82 cooperates with the stationary drum connector 80 to be attached to the main rim portion 16 of the drum member 14 as will be explained.

The stationary drum connector 80 includes a support member 84 secured as by welding to the front wall 70 of the housing member 66 and having a drum contact member 86 secured to an outer end thereof. The drum contact member 86 is inclined downwardly and inwardly toward the housing member 66 and having a main plate member 88. The main plate member 88 is provided with a lower tapered edge section 90 for engagement and contact with an inner portion of the main rim portion 16 of the drum member 14.

The actuator drum connector 82 includes (1) an actuator connector member 92 secured to and having portion placed about the housing member 66; (2) a bias member 94 connected to the actuator connector member 92 and engagable with the housing member 66; and (3) anchor members 96 secured to the front wall 70 of the housing member 66 to receive the actuator connector member 92 therein.

As noted in FIG. 6, the actuator connector member 92 is provided with a U-shaped support rod 98 having a drum contact plate 106 secured thereto. The U-shaped support rod 98 is provided with parallel leg sections 102 interconnected by an intermediate leg section 104. The drum contact plate 106 is of a generally rectangular shape having an outermost edge portion 108 to engage a lower surface of the lip portion 18 of the drum member 14 as noted in FIG. 2.

As noted in FIG. 7, the bias member 94 is a coiled spring structure having a main spring body 110 integral with a stationary leg member 112 at one end and, at an opposite end, with a movable leg member 114. The stationary leg member 112 is provided with a contact portion 115 which engages the front wall 70 of the housing member 66 to provide a reaction force for movement of the actuator contact member 92 as will be explained.

The movable leg member 114 is provided with a arcuate section 116 which is engagable with an undersurface of the intermediate leg section 104 of the U-shaped support rod 98 for biasing same in a clockwise direction as noted in FIG. 2.

The anchor member 96 includes a pair of spaced tube sections 118 secured as by welding to the front wall 70 of the housing member 66 as noted in FIG. 5.

USE AND OPERATION OF THE INVENTION

In the use and operation of the drum dolly attachment apparatus 12 of this invention, in the normal upright position of FIG. 1, the first step is to position the same adjacent the drum member 14. In this position, it is noted that the drum member 14 may be tilted outwardly so as to be placed between the opposed arm portions 45 of the arcuate support tube 40 of the barrel support assembly 34. At this time, the foot support members 42 are placed underneath a bottom support ring on the drum member 14 to provide vertical support.

Next, the attachment handle member 64 is grasped for vertical axial movement of the entire drum attachment assembly 22 on the primary support tube 50. On being elevated above the main rim portion 16 of the drum member 14, the drum attachment assembly 22 can be moved downwardly by attachment handle member 64 and gravity whereupon the stationary drum connector 80 is placed within an upper surface of the main rim portion 16 as noted in FIG. 2. On this initial movement, the drum contact plate 106 would contact an upper surface of the main rim portion 16 of the drum member 14 and move in a counter clockwise motion as noted in FIG. 2 against the spring action of the bias member 94.

On further downward movement of the drum attachment assembly 22, the actuator connector member 92 would move in a clockwise direction as noted in FIG. 2 as shown by an arrow 117. In this condition, it is obvious then that the main handle assembly 38 can be moved in a rearward manner whereupon the drum attachment assembly 22 is operable to move axially a small distance as so required to achieve a cam type locking action with the main rim portion 16 of the drum member 14. In this condition, as noted in FIG. 2, the drum contact member 86 and the drum contact plate 106 are of substantial axial alignment and grasping the main rim portion 16 to achieve the positive cam locking action.

After transporting the drum member 14 with the dolly truck assembly 20 to a desired location, it is noted that the drum member 14 can then be moved to an upright vertical condition as noted in FIG. 1. Then, the operator can grasp the attachment handle member 64 in one hand and lower the drum attachment assembly 22 a slight distance while concurrently grasping the leg section 102 position adjacent the back wall 74 of the housing member 66. The support rod 98 is then pivoted downwardly in a counter clockwise direction as noted in FIG. 2 to move the drum contact plate 106 towards the front wall 70 of the housing member 66 against the force of the bias member 94.

In this condition, the entire drum attachment assembly 22 can be moved upwardly vertically to free and clear the same from the main rim portion 16 of the drum member 14. Then, the entire drum attachment apparatus 12 can be moved outwardly from contact of the foot support members 42 under the drum member 14 so that another drum attachment and conveyance operation can then be initiated in a manner as previously described.

FIGS. 8-12, inclusive, illustrate the connection of the drum attachment assembly 22 to various styles of main rim portions 16 on other embodiments of drum members 14. More specifically, in FIG. 8, a drum member 14 is provided with an upper main rim portion 16 having a square barrel edge 119 integral with a recessed upper dome section 120. It is seen that the contact plates 86, 106 are adapted to contact opposed sides of the square barrel edge 119 for positive locking action.

As noted in FIG. 9, the drum member 14 is provided with an upright barrel edge 121 adjacent a dome top section 122. Similarly, the contact plates 86, 106 are substantially aligned in contacting and grasping the upright edge section 121.

As noted in FIG. 10, the drum member 14 includes a rolled barrel edge 123 integral with the dome top section 122. Again, the contact plates 86, 106 are substantially in alignment grasping opposite sides of the rolled barrel edge 123.

As noted in FIG. 11, the drum member 14 includes an irregular shaped barrel edge 124 adjacent an intermediate top section 125. The contact plates 86, 106 contact opposed sides of the irregular barrel edge 124 for grasping same.

As noted in FIG. 12, the drum member 14 is provided with a pointed barrel edge 128 adjacent an arcuate top section 129. The contact plate members 86, 106 contact opposite aligned sides of the pointed barrel edge 128 for grasping in a cam action.

It is seen that the drum dolly attachment apparatus 12 is operable to readily grasp various configurations of the main rim portions 16 of various types of drum members 14. The drum attachment assembly 22 of this invention has been necessary due to presently designed main rim portions 16 which are found on the modern day plastic, cardboard, and fiberglass type drum members which are popular in containing caustic chemicals and the like.

It is noted that the drum dolly attachment apparatus of this invention can be readily attached to existing dolly truck assemblies in the prior art as only required that the same be clamped about a primary support tube for axial movement therealong. The drum dolly attachment apparatus of this invention is economical to manufacture; simple to use; reliable in operation; and substantially maintenance free. The specific novel feature of the drum connector assembly of this invention operates to provide a positive cam actuator type connecting system which will not inadvertently become disconnected from the drum member and, therefore, presents a safety feature not found in the prior art structures.

While the invention has been described in conjunction with preferred specific embodiments thereof, it will be understood this description is intended to illustrate and not to limit the scope of the invention, which is defined by the following claims.

I claim:

1. A drum attachment assembly connectable to an upright support tube on a dolly truck assembly and operable to be releasably connected to a main rim portion on a drum member, comprising:
   (a) a drum contact member of generally V-shape operable to contact an upper side wall of the drum member adjacent the main rim portion to provide abutment and prevent movement of the drum member in one lateral direction;
   (b) a drum attachment assembly connected to a support member on a dolly truck assembly for adjustable vertical movement thereon;
   (c) said drum attachment assembly includes a stationary drum connector engagable with an upper inner portion of the main rim portion of the drum member and an actuator drum connector assembly engagable with a lower outer portion of the main rim portion of the drum member;
   (d) said drum attachment assembly includes a main support housing assembly slidably mounted on said support member having said stationary drum connector secured thereto;
   (e) an attachment handle member secured to said main support housing assembly operable to be grasped for vertical movement of said drum attachment assembly on said upright support tube of said dolly truck assembly;
   (f) said stationary drum connector includes a drum contact member which is inclined toward said housing, and said drum contact member having an inclined edge section engagable with an upright inner portion of the main rim portion of the drum member; and
   (g) said actuator drum connector includes an actuator contact member pivotally connected to said main support housing assembly and having a bias member to bias said actuator contact member into a position which is inclined away from said housing so as to be adjacent to and substantially aligned with said drum contact member and into contact with an outer lower portion of the main rim rim portion on the drum member.

2. A drum dolly attachment apparatus as described in claim 1, wherein:
   (a) said actuator contact member includes a U-shaped support rod mounted about said main drum support housing assembly secured to a drum contact plate with an outer edge portion engagable with a lower outer portion of the main rim portion of the drum member to form a cam action in cooperation with said stationary drum connector;
   (b) said bias member is mounted about said support rod to bias same into an engaged condition with said drum contact plate contacting said outer lower portion of the main rim portion on the drum member;
   (c) said support rod having a leg section biased into contact with said main support housing assembly in said engaged condition; and
   (d) said leg section is pivotal against said bias member to move said drum contact plate to a dis-engaged condition out of contact with the main rim portion of the drum member.

3. A drum dolly attachment apparatus as described in claim 2, wherein:
   (a) said bias member being a coiled spring member engagable with said main support housing assembly and said actuator contact member to bias said actuator contact member into engagement with the main rim portion of the drum member.

4. A drum dolly attachment apparatus as described in claim 1, wherein:
   (a) said drum contact plate and said actuator contact member achieve alignment by having substantially the same inclination with respective portions thereof overlapping a common plane when in the attached position to the main rim portion of the drum member to form a positive cam action for clamping thereon.

* * * * *